C. S. FRANKLIN.
AERIAL CONDUCTOR.
APPLICATION FILED DEC. 31, 1913.

1,141,387.

Patented June 1, 1915.

Witnesses
Perly P. Fallon.
Margaret MacIntyre

Inventor
Charles Samuel Franklin,
By his Attorneys,

UNITED STATES PATENT OFFICE.

CHARLES SAMUEL FRANKLIN, OF LONDON, ENGLAND, ASSIGNOR TO MARCONI WIRELESS TELEGRAPH COMPANY OF AMERICA, OF NEW YORK, N. Y., A CORPORATION OF NEW JERSEY.

AERIAL CONDUCTOR.

1,141,387.     Specification of Letters Patent.     Patented June 1, 1915.

Application filed December 31, 1913. Serial No. 809,607.

*To all whom it may concern:*

Be it known that I, CHARLES SAMUEL FRANKLIN, a subject of the King of Great Britain, residing at Marconi House, Strand, London, England, have invented new and useful Improvements in Aerial Conductors, of which the following is a specification.

The object of this invention is to provide an improved aerial which shall have good directional properties as well as be an efficient radiator and absorber of electromagnetic waves.

It is known that an aerial consisting of one or more turns of wire wound in the shape of a rectangle or other polygon and placed with its plane vertical to the earth has good directional properties for transmitting and receiving electro-magnetic waves but is a very inefficient radiator or absorber of these waves. It is also known that the radiation and absorption are greatly improved by employing one turn inclosing as large an area as possible and by inserting a small condenser in series with the aerial so that the latter is in tune with the wave to be transmitted or received. Even when this is done the dimensions of the aerial are still small compared with the wave length and the aerial is therefore an inefficient radiator and absorber of electro-magnetic waves.

According to this invention condensers are introduced at approximately equal distances all around the closed aerial circuit, the capacity of each condenser being so adjusted that for the particular wave length to be used it just compensates for the inductance of the part of the circuit joining it to the next condenser.

Figure 1:
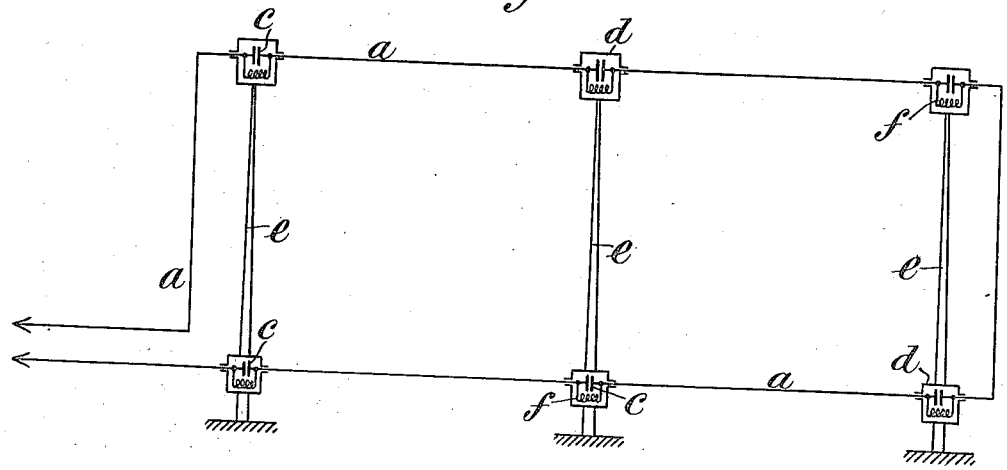
Figure 2:
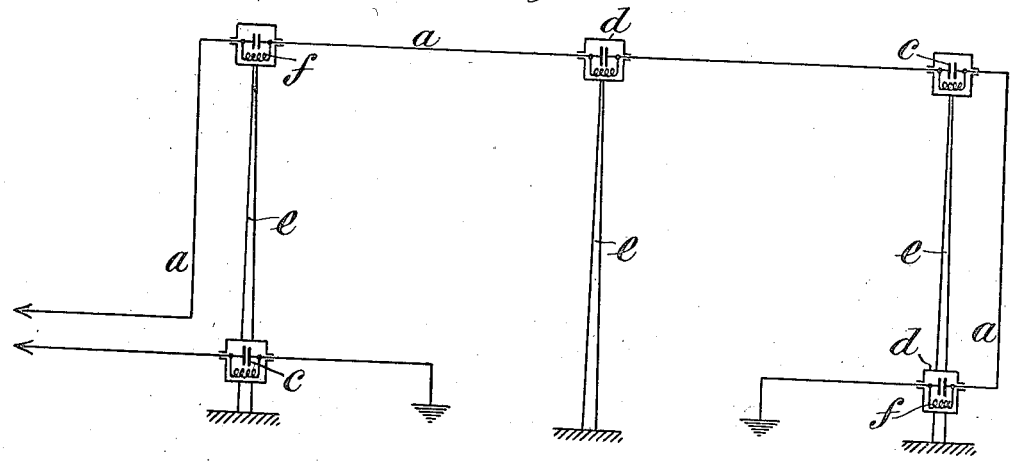

The accompanying drawing illustrates my invention, Figure 1 being a diagram showing an aerial constructed in accordance with the invention and Fig. 2 a diagram of a modification in which the earth forms part of the lower side of the rectangle.

$a$ is the aerial conductor having condensers $c$ introduced at various points. These condensers are contained in waterproof cases $d$ supported by masts $e$ and coils $f$ of high inductance are placed in parallel with each condenser to prevent electrostatic charges accumulating.

The distance between the two extreme parts of such an aerial circuit may be as great as half a wave length and the aerial will then be a very powerful radiator and absorber of electro-magnetic waves and at the same time will have the good directional properties of a small closed circuit.

What I claim is:—

1. In a system of wireless telegraphy, an aerial conductor consisting of a closed circuit in a vertical plane, having condensers distributed around it, the capacity of each being such that it compensates for the inductance of the part of the conductor joining it to the next condenser, substantially as described.

2. In a system of wireless telegraphy, an aerial conductor consisting of a closed circuit in a vertical plane, having condensers distributed around it, the capacity of each being such that it compensates for the inductance of the part of the conductor joining it to the next condenser, and a coil of high inductance shunting each condenser, substantially as described.

3. In a system of wireless telegraphy, an aerial conductor consisting of a closed circuit in a vertical plane, having condensers distributed around it, the capacity of each being such that it compensates for the inductance of the part of the conductor joining it to the next condenser, a coil of high resistance shunting each condenser, and a water proof case containing each condenser and its inductance, substantially as described.

CHARLES SAMUEL FRANKLIN.

Witnesses:
J. ST. VINCENT PLETTS,
GEORGE JAMES TRUSTY.